(No Model.)
J. B. WEBSTER.
AUTOMATIC REGULATOR FOR HEATING APPARATUS.
No. 563,945. Patented July 14, 1896.
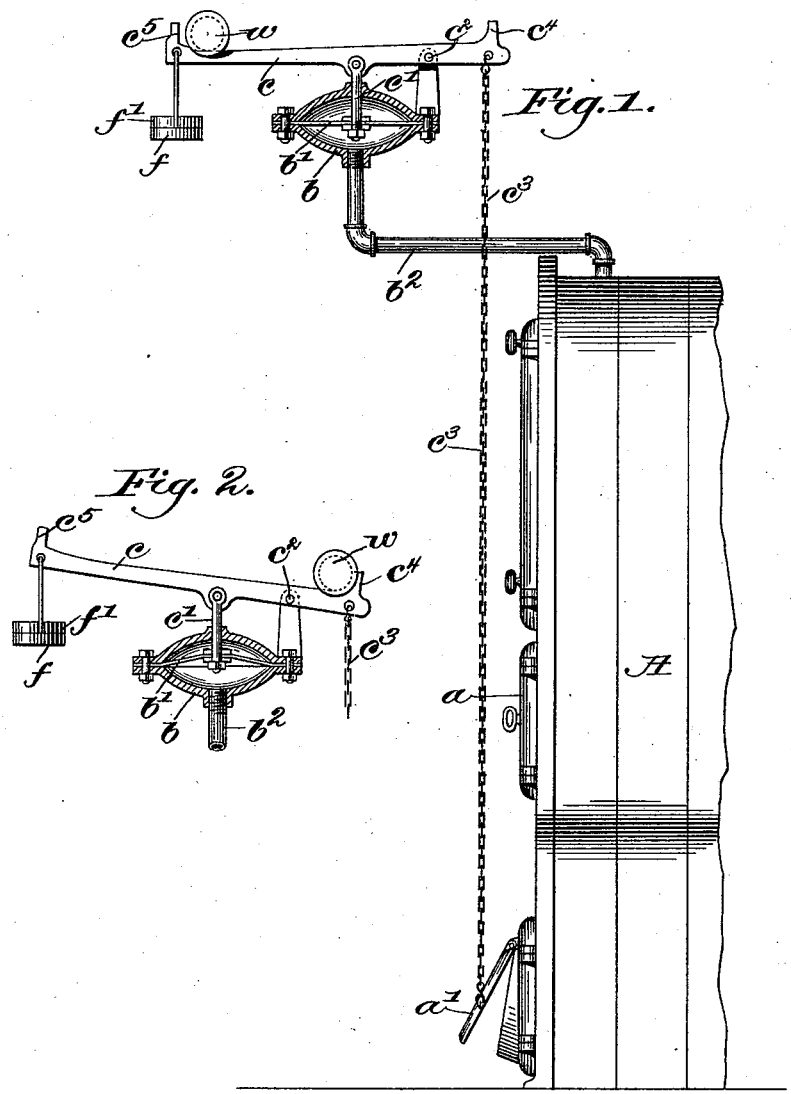
Witnesses:
A. C. Harmon
Thomas J. Drummond
Inventor:
John B. Webster
by Crosby Gregory
attys.

UNITED STATES PATENT OFFICE.

JOHN B. WEBSTER, OF BOSTON, MASSACHUSETTS.

AUTOMATIC REGULATOR FOR HEATING APPARATUS.

SPECIFICATION forming part of Letters Patent No. 563,945, dated July 14, 1896.

Application filed February 29, 1896. Serial No. 581,302. (No model.)

*To all whom it may concern:*

Be it known that I, JOHN B. WEBSTER, of Boston, county of Suffolk, State of Massachusetts, have invented an Improvement in Automatic Regulators for Heating Apparatus, of which the following description, in connection with the accompanying drawings, is a specification, like letters on the drawings representing like parts.

Heating apparatus are now very generally provided with devices intended to automatically regulate the apparatus to maintain, for instance, a substantially constant steam-pressure or other condition of the heating medium, whether it be steam, hot water, air, or the like. A common example of devices of this class is the well-known diaphragm-regulator, wherein a weighted lever connected with one or more of the dampers of the heater is supported in its normal position upon a flexible diaphragm arranged within a steam-jacket in communication with the steam-space of the boiler. When the steam-pressure reaches a certain degree, the diaphragm will be raised by the pressure of the steam acting upon its under side, and will thereby lift the weighted lever and close or otherwise change the condition of the dampers or valves to check the heater. When the steam-pressure falls below the predetermined point necessary to support the diaphragm in its elevated or abnormal position, the weighted lever is permitted to again drop and open or otherwise change the dampers or valves to their original condition to again start up the heater, this operation being repeated as long as the heater is left under the control of the regulating device. An objection to regulators operating in this manner is that when set, for instance, to close the dampers or check the heater when five pounds of steam have been generated the weighted levers will be raised and the dampers changed when the five-pounds limit has been reached, but the moment the steam-pressure, by reason of the checking of the heater, drops to, say, four pounds, or it may be four and a half pounds, the weighted lever set for five pounds immediately resumes its normal position and again starts up the heater. This involves in many instances a serious waste of fuel, for the heater, when once checked, having generated steam at a pressure of five pounds, may just as well be permitted to remain checked until the pressure has dropped to one pound or less, and thereby use up or utilize for heating purposes the steam which has been thus generated and stored without further expenditure of fuel.

The regulating devices commonly constructed, of which the diaphragm-regulator described is an example, are, however, incapable of holding the heater checked after the steam has slightly fallen, and the object of my invention is to provide a regulating device which, when moved to close the dampers or check the heater, is capable of holding the heater checked for such period of time as will enable the heat which has been stored up during the time when the heater was opened to be utilized for heating purposes or for work before the heater is again started up to restore the heating medium to its highest temperature or pressure.

In the drawings illustrating one embodiment of my invention, Figure 1, in elevation, partial section, illustrates a sufficient portion of a heater provided with an automatic regulator embodying my invention to enable the latter to be understood; Fig. 2, a detail showing the parts of the regulator in elevated or abnormal position.

Referring to the drawings, A represents part of a typical heating apparatus or heater provided with a usual fuel-door $a$ and ash-pit door $a'$, which latter constitutes a damper for regulating the heater, the heater being checked when the door $a'$ is closed or dropped and started up when said door is opened, as shown in Fig. 1 of the drawings.

My novel regulator, as herein embodied, has a usual shell $b$, containing a suitable flexible diaphragm $b'$, adapted to be raised and dropped by the varying pressure of the heating medium, herein steam, admitted to the diaphragm $b'$ through the pipe or connection $b^2$, leading to the heater.

The lever $c$, which I shall hereinafter denominate as the "fulcrumed" member, is supported by a pin $c'$ on the diaphragm $b'$ and is fulcrumed at $c^2$, said lever being shown as provided at one end with a usual holder $f$ for the reception of one or more counterbalancing-weights $f'$, and connected at its opposite end by a suitable connection $c^3$ (shown as a chain) with and to control the movements of the door or regulating damper or valve $a'$. Upon this lever $c$ I have mounted a suitable weight $w$, which is designed to depress the lever $c$, yet which, by reason of its freedom to roll when the lever is raised or lowered, consitutes what I shall hereinafter denominate as a "holding device."

The operation of the regulator is as follows, viz: Assuming the holding device $w$, when in its normal position at the outer end of the fulcrumed member $c$, to be adjusted to hold said fulcrumed member in its depressed position against all pressures below five pounds, when said pressure reaches or exceeds five pounds, the diaphragm $c'$ will be raised, thereby raising the fulcrumed member $c$ into its position, Fig. 2, causing the holding device $w$ to roll in the direction of the arrow, Fig. 1, into its position, Fig. 2, close to and herein beyond the fulcrum $c^2$, where it is brought to a standstill by a suitable stop $c^4$, such movement of the said fulcrumed member dropping and closing the door or damper $a'$ and checking the heater. This change in position of the holding device operates, of course, to reduce the load upon the fulcrumed member $c$, so that a pressure much below five pounds will now hold said fulcrumed member in its elevated position to maintain the door $a'$ or damper closed to hold the heater checked. The door $a'$ is thus held closed and the heater checked until the steam-pressure, which has been accumulated up to five pounds or more, has been utilized for heating or working purposes sufficiently to reduce said pressure to, say, one pound or less, when the weight of the fulcrumed member $c$ and its weight or weights $f'$ will depress the diaphragm to its normal position, Fig. 1, thereby causing the holding device $w$ to roll down the slightly-inclined top of said fulcrumed member into its extreme position, Fig. 1, where it is stopped by the lug $c^5$ on the end of said roller. It will thus be evident that while a considerable pressure, say of five or more pounds, is necessary to check the heater, when once checked it is maintained in such condition until all this accumulated pressure representing so much heat has been utilized, when the heater is again opened and a new pressure accumulated. In this way the consumption of fuel is greatly reduced over prior arrangements, wherein the dampers having been closed, by reason of the steam reaching a maximum pressure of, say, five pounds, are at once again opened as soon as the pressure falls to four and a half pounds, and the amount of heat represented by the four pounds of steam is simply a reserve which must be constantly maintained by the heater in excess of what is actually used and of course at the expense of fuel.

If one or more counterbalancing-weights $f'$ be removed, the holder $w$, when caused to roll to its extreme position at the right, Fig. 2, will overbalance the free end of the member $c$ and permanently hold said member in its elevated position with the heater closed, even though the steam-pressure subsequently fall. This is useful in such instances as the fixing of a fire for night, where it is desired to leave the heater open a sufficient time to burn off the gas and then close it up. The device arranged as described accomplishes this, for when set with the valves or dampers open they will be so held until the gas is burned off and steam begins to be generated, when the member $c$ will be raised and the holder $w$ caused to move to its position, Fig. 2, to hold said member in its raised position with the dampers closed for the rest of the night.

Of course the regulator is capable of a wide range of adjustment for varying conditions by proper relative adjustment of the weight $w$ and weight or weights $f'$.

My invention is not limited to the particular embodiment herein shown, for the same may be varied without departing from the spirit and scope of my invention, the invention being applicable to all kinds of heaters and heating mediums, as will be noticed by those skilled in the art.

I claim—

In an automatic regulator for heating apparatus, a controlling member pivotally mounted intermediate its ends, a counterbalancing-weight removably connected thereto at one side of the pivot, and a holding device mounted on said controlling member to roll thereon from one to the other side of the said pivot between suitable stops provided therefor, substantially as described.

In testimony whereof I have signed my name to this specification in the presence of two subscribing witnesses.

JOHN B. WEBSTER.

Witnesses:
 FREDERICK L. EMERY,
 LAURA S. MANIX.